US010044596B2

(12) United States Patent
Ostrom et al.

(10) Patent No.: US 10,044,596 B2
(45) Date of Patent: Aug. 7, 2018

(54) DEVICES, METHODS, AND SYSTEMS FOR PACKET REROUTE PERMISSION BASED ON CONTENT PARAMETERS EMBEDDED IN PACKET HEADER OR PAYLOAD

(71) Applicants: Carl D. Ostrom, Nevada City, CA (US); Graeme M. Little, Nevada City, CA (US)

(72) Inventors: Carl D. Ostrom, Nevada City, CA (US); Graeme M. Little, Nevada City, CA (US)

( * ) Notice: Subject to any disclaimer, the term of this patent is extended or adjusted under 35 U.S.C. 154(b) by 0 days.

(21) Appl. No.: 14/046,538

(22) Filed: Oct. 4, 2013

(65) Prior Publication Data

US 2016/0057050 A1    Feb. 25, 2016

Related U.S. Application Data

(63) Continuation-in-part of application No. 14/046,390, filed on Oct. 4, 2013.

(60) Provisional application No. 61/710,305, filed on Oct. 5, 2012.

(51) Int. Cl.
*H04L 12/707* (2013.01)
*H04L 12/701* (2013.01)

(52) U.S. Cl.
CPC .................................. *H04L 45/00* (2013.01)

(58) Field of Classification Search
CPC ...... H04L 45/00; H04L 45/308; H04L 45/122; H04L 45/12; H04L 45/121
See application file for complete search history.

(56) References Cited

U.S. PATENT DOCUMENTS

| 6,778,493 | B1 * | 8/2004 | Ishii ................. H04L 29/06027 370/229 |
| 2002/0141401 | A1 | 10/2002 | Albert et al. |
| 2005/0198282 | A1 * | 9/2005 | Stahl ....................... G06Q 30/06 709/225 |
| 2008/0285560 | A1 * | 11/2008 | Curtis ..................... H04L 45/00 370/392 |
| 2012/0287791 | A1 | 11/2012 | Xi et al. |
| 2013/0266018 | A1 | 10/2013 | Ashida et al. |
| 2014/0140345 | A1 | 5/2014 | Ostrom et al. |

* cited by examiner

*Primary Examiner* — Thai Nguyen
(74) *Attorney, Agent, or Firm* — Stamoulis & Weinblatt LLC

(57) ABSTRACT

Devices, methods, and systems are described for the execution of packet reroute authorization based on payload specific parameters embedded in either the payload or packet header. The described methods may be used for media production systems. The methods may also be configured for other applications in any packet based routing environment to provide payload or execution description parameters embedded in either the payload or packet header for routing control of any packet based traffic.

38 Claims, 12 Drawing Sheets

Traditional Broadcast System Block Diagram

Traditional Broadcast System
IP Block Diagram

Packet Header Modification Block Diagram

Table Change Process Block Diagram

Source Oriented Control Flow Chart

Source Oriented Signal Flow Chart

Destination Oriented Control Flow Chart

Table Modification Control Flow Chart

Example Packet Parameter ID Placement

Example Packet Parameter ID Data Placement

DEVICES, METHODS, AND SYSTEMS FOR PACKET REROUTE PERMISSION BASED ON CONTENT PARAMETERS EMBEDDED IN PACKET HEADER OR PAYLOAD

This application is a continuation-in-part of U.S. patent application Ser. No. 14/046,390, filed on Oct. 4, 2013, entitled "DEVICES, METHODS, AND SYSTEMS FOR CENTRALIZED CONTROL OF IP ROUTING," which claims priority to U.S. Patent Application No. 61/710,305 filed on Oct. 5, 2012. Each of the applications is incorporated in its entirety.

BACKGROUND OF THE INVENTION

1. Field of the Invention

The present invention relates methods, systems, and devices for packet reroute authorization based on one or more payload parameters embedded in, for example, a packet header or payload.

2. Background

Media production systems may require that changes in media content that is routed within a network to a specific destination be executed under critical timing constraints. The timing of the execution of a change in routing may be associated with timing data related to the content itself. Traditional media systems may have the timing data embedded in the digital stream along with the video and audio in a predetermined location so that network components locate and read the timing data and grant permission to switch the stream in accordance with the timing data. However, current routers or similar devices do not possess and system, method, or device to locate timing data in certain media systems.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

SUMMARY

Figure 1:
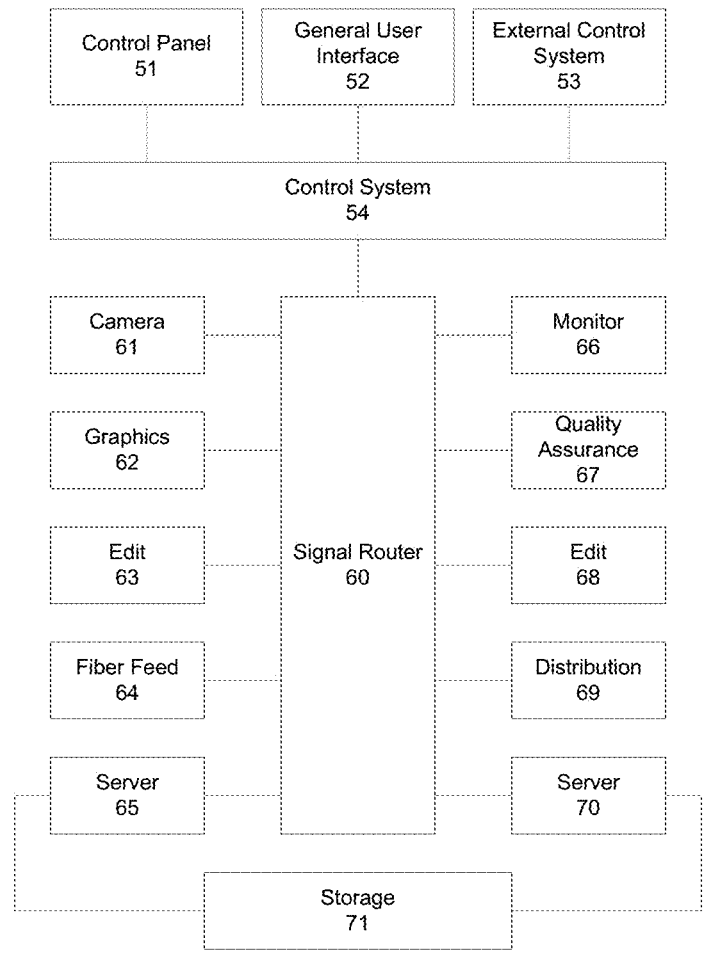
FIG. 1 illustrates a broadcast system in an embodiment.

In one aspect, there is described a method for routing data in an Internet Protocol (IP)-based network that includes providing a data packet, determining a route execution control parameter in the data packet, forwarding the data packet based on the route execution control parameter.

The method may further include determining if the execution control parameter is located in a packet payload, or determining if the execution control parameter is located in a packet header.

In another aspect, the method includes determining if the execution control parameter is linked to a single event, or determining if the execution control parameter identifies a continuous condition. The single event may be a specified point in time. The single event may be one of a content segment boundary descriptor, content time stamp, and a media time code. The single event may be one of a content segment boundary descriptor, content time stamp, and a media time code. The continuous condition may be a type of content.

In another aspect, the method may include comparing the execution control parameter to a field in one of a route table and process instruction bin, or removing an inhibit flag in the instruction bin to enable a continuous forwarding instruction.

In another aspect, there is described a computer program product for routing data in an Internet Protocol (IP)-based network that includes providing a data packet, determining a route execution control parameter in the data packet, forwarding the data packet based on the route execution control parameter.

DETAILED DESCRIPTION

Each of the additional features and teachings disclosed below can be utilized separately or in conjunction with other features and teachings to provide a device, system, and/or method for providing for packet reroute authorization based on payload specific parameters embedded in either the payload or packet header. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings In Internet Protocol (IP)-based distribution systems, the timing data may be located in the payload section of the packet along with the video and audio. One way to accommodate this requirement is to modify packet routing and switching devices such that they have the ability to locate and accommodate this information in the payload. Another method is to provide or define the timing data for the payload in a header field of the packet such that the IP router or switch can locate and read the data and use the timing data as part of its packet routing decision process. The methods may be performed in hardware or software or combination of both.

Media distribution systems may be able to separate the video from the audio (or other media content), sending each to a separate destination. One way to accommodate this requirement is to define or provide the content type for the payload in a header field of the packet such that the IP router or switch may locate and read the content type and use this data as part of its packet routing decision process. The methods may be performed in hardware or software or combination of both.

There is provided a method of router awareness of specific packet payload content parameters by embedding the payload parameters in a header field accessible to the packet router or switch. While the process defined and the examples given utilize the header for the content parameter location, the permission process defined in and covered may also apply to systems where these content parameters are located in the payload portion of the packet. The parameters may be the payload. In one embodiment, this may occur when the packet is created during the encapsulation process at the source.

The described methods may also be used for any application where a time or condition parameter is desired to affect the signal routing processes.

Devices, methods, and systems are described for the execution of packet reroute authorization based on payload specific parameters embedded in either the payload or packet header. The described methods may be used for media production systems. The methods may also be configured for other applications in any packet based routing environment to provide payload or execution description parameters embedded in either the payload or packet header for routing control of any packet based traffic.

A command from an external control device or system, such as a manual controller, media edit decision list, or schedule based controller, may request a device acting as an IP router to route a packet to a destination when specific criteria are met. These criteria may be dependent on descriptive information in the packet payload, such as content type or a content time stamp descriptor. IP routers and switches may not read packet data located in the packet payload.

IP routing protocols may define what part of the packet header contains information necessary to forward a packet within a network environment. For example, the location may be either the destination IP address or the destination MAC address. In another example, protocols working with IGMP3 multicast routing use the source IP address as well as the multicast group destination address in the header may be used to determine the routing process and permission. Accordingly, the disclosed methods and systems may include one or more processes to place packet route execution timing and permission data within the packet header as well to make it easier for a router or switch to locate this permission data.

An IP router may contain either a route table or embedded execution control process that may allow for route forwarding or reroute of packets in an IP stream based on either timing or other conditions, such as content type (video, surround sound, second language, etc.) or specific content descriptor (Camera 1, Blimp Camera, natural sound, etc.). The process may be executed in hardware, software, or a combination of both. If the data necessary to define the requested execution timing or condition is part of the payload content, this information may be available to the route functions in the IP router or switch. In the event this function is supported in the IP router or switch, a field may be defined in the packet header where content descriptive data, such as content type or content timing, may be placed. When the data in this header field meets the criteria in either the route table or other route instruction process, the router may receive permission to execute the packet forwarding or reroute request specified in the route table or execution control process.

Devices, methods, and systems are described for the execution of centralized control of IP routing. The described methods may be used for video production systems. The methods may also be configured for other applications or in any IP routing environment to provide centralized routing control of any IP traffic.

A command from an external control device or system may command a device acting as an IP router to modify the destination address in an incoming IP stream to route that stream to a desired destination device. An IP stream may be resident in the device performing the packet header modification (PHM) in order to modify the IP headers. The source IP address in the IP stream header may be used to define the source, when one or more input streams are directly coupled to the PHM device.

Sources may be coupled to and may be fed to a PHM device over an IP network using one or more multiple routers. The destination address in the stream may route the stream through the PHM device. One or more PHM devices may be used. The destination address in the IP header may be used to define the PHM device as the destination. In one embodiment, this may be accomplished by using one destination address for one or more sources and using the stream source address to define the source of the stream. In another embodiment, a different destination address for each source may be used. In another embodiment, a unique destination address may be used to define the source IP stream. Accordingly, the PHM device may be configured to act as the destination for multiple IP addresses.

The devices, methods, and systems may be configured to support either unicast or multicast IP streams. In one embodiment, the Multicast Group Address may be configured as the destination address. It should be noted that either the source or destination address may be used in the IP stream header to define the source stream. It should also be noted in the following examples the use of the destination address in the source stream to define the source stream is described.

The described methods may be performed in an IP router. In one configuration, the methods may be performed prior to an actual route function in the router such that the new destination in the stream may be routed using an existing Address Resolution Protocol (ARP), MRoute, or Network Address Translation (NAT) or similar technology table in the router.

The described methods may also be configured for an application specific dedicated address replacement device. In this configuration, one or more forwarding tables may be in the device providing the forwarding Media Access Control (MAC) addresses for each subscribing destination (unicast or multicast) with an IP header insertion function for the forwarding addresses.

FIG. 1 illustrates a video production system including one or more sources. The sources may include video cameras 61, graphics computers 62, edit systems 63, playout servers 65, network feeds 64, and other suitable sources for sourcing media content. Any number of sources may be included in the video production system.

A control system 54 may be configured to respond to one or more work flow processes which manage, schedule, define, and/or control what media content from the sources may be available to specific processing, such as edit and server 68 and 70, distribution 69, or monitoring and quality assurance 66 and 67. These work flow processes may be initiated by control panels 51, graphic user interfaces 52, or external control system interfaces 53, The control system 54 may instruct the distribution devices to route selected sources 61-65 to selected specific designations 66-70, as needed. Such control may be initiated via manual control panels 51, computer General User Interface (GUI) surfaces 52, or through an external control system 53, such as a computer based automation system generating route requests defined in a time based execution schedule.

A centralized signal router 60 may route serial data streams between selected sources 61-65 and selected destinations 66-70. The control system 54 may be configured to conduct signal routing by communicating with the signal router 60. Communication between the control system 54 and the signal router 60 enables accurate signal transition timing, route status, path assignment permission, and/or management of route conflict avoidance parameters.

Figure 2:
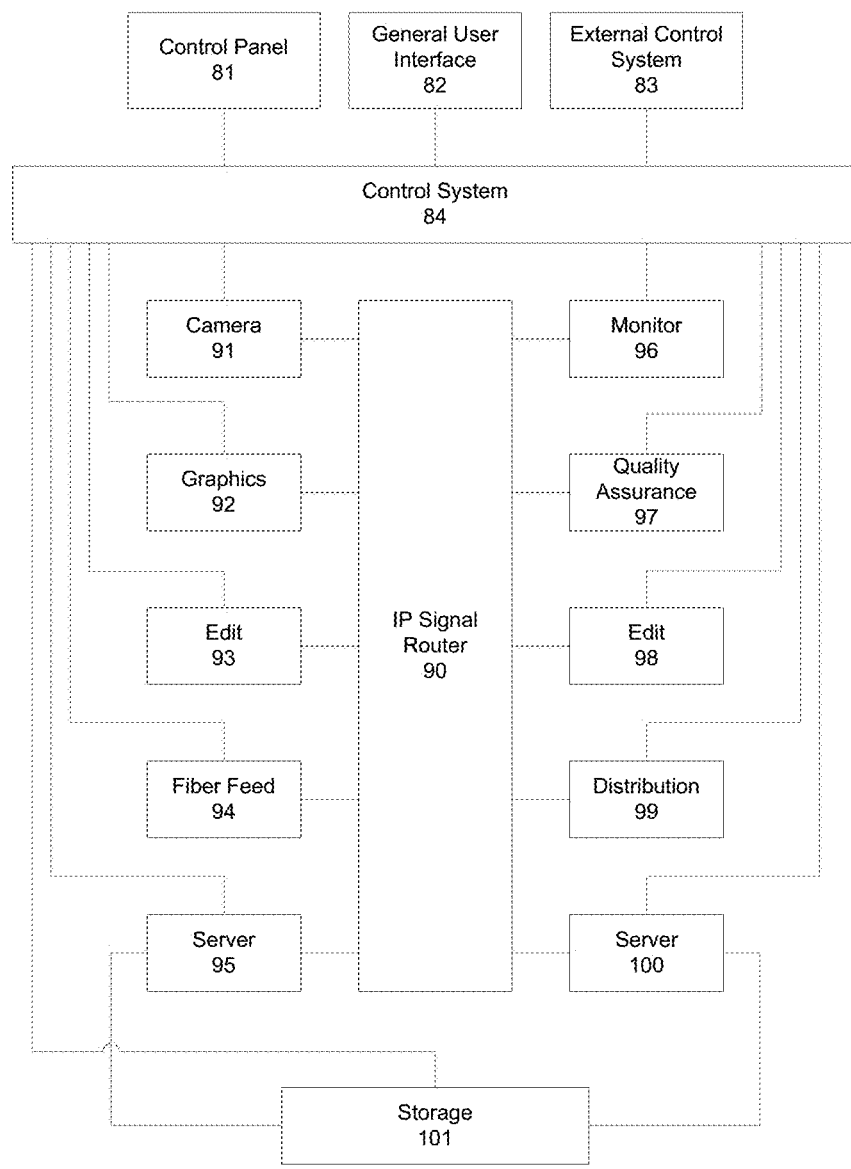
FIG. 2 illustrates an IP broadcast system in an embodiment.

FIG. 2 illustrates a video production system including an IP infrastructure having an IP router 90. In this configuration, the IP router 90 may route signals using unicast or multicast. For unicast IP streams the signal routing may be accomplished by reading the desired destination embedded in an IP signal. In one embodiment, the signal destination may be defined at the signal source. To change the destination of the source stream, the new destination may be communicated to the signal source in order to add a new destination to the original signal. In one embodiment, the control system may be configured to communicate with one or more sources.

A source may deliver a multicast signal to the network and let a destination define the source to join. The control system may be configured to communicate with one or more destination devices to communicate to the destination which source it is to join.

Figure 3:
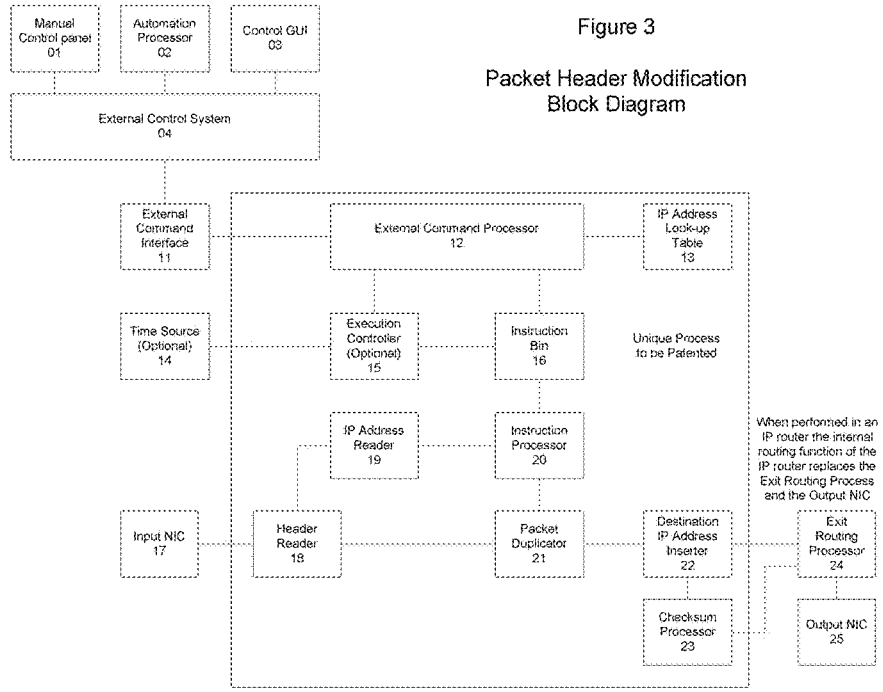
FIG. 3 illustrates a system for packet header modification in an embodiment.
Figure 4:
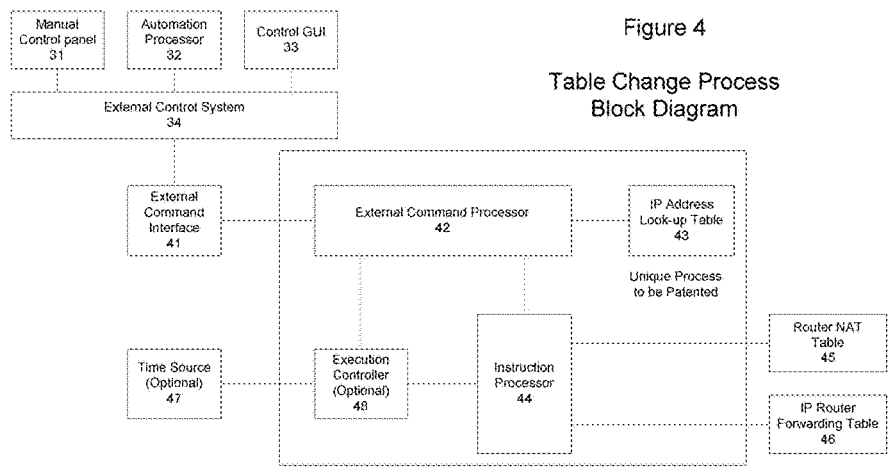
FIG. 4 illustrates a system for a table change process in an embodiment.

FIG. 3 illustrates a system for the centralized control of IP traffic. An external command interface 11 may be configured to receive a command string from an external control system 04. This command may be initiated from a manual control panel 1, an automation computer 2, or a GUI surface 3. Other suitable devices or a combination of devices for initiating a command may be used. The external control system 4 may read command requests and create a command data stream that contains data to define a specific routing instruction request. The command string including a routing request may also be received by the external command interface 11. The command string may define the source and destination data in a native nomenclature of the external control system. The command string may also include the IP addresses of either the source or destination.

Referring again to FIG. 3, the external command interface 11 may interpret a request by parsing the data in the command string and defining data in the string to send to an external command processor 12. The data may include an input source of packets to be routed to a new destination, a new destination to where packets are to be sent, a new route or an addition or replacement to an existing route, and a time for an instruction to take effect.

In one embodiment, the external command processor may organize the data for managing the routing instructions with source oriented control and/or destination oriented control. Other route management methods may also be used. In addition, the methods, devices, and systems may be used in a variety of networks using packet header addresses and/or routing methods.

Figure 5:
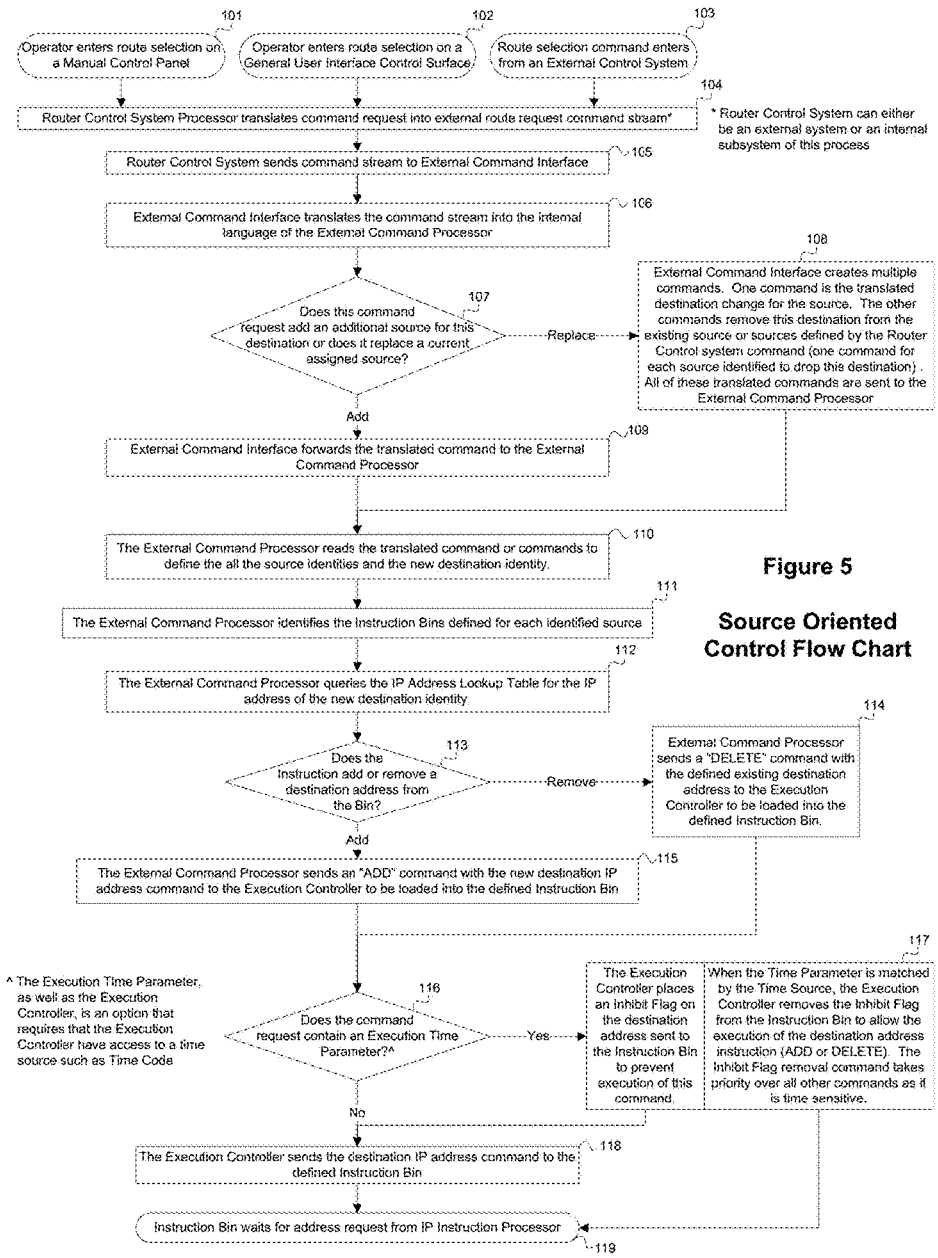
FIG. 5 illustrates a source oriented process in an embodiment.

FIG. 5 illustrates a process flow for a method of source oriented control in one embodiment. Source oriented routing may organize the routing instructions based on the incoming source data stream. In this method, each source data stream may have an associated or assigned instruction stack or instruction bin 16. In one embodiment, the destinations to which a stream is to be sent are listed in the instruction bin for that source stream.

Referring again to FIG. 3, the external command processor 12 may query the IP address lookup table 13 for the IP address of the source and destination defined in the command request. The IP address lookup table 13 may include the IP addresses defined for sources and destinations in the system. In this example, the source IP address may be defined as the destination IP address (multicast or unicast) in the packet header from the source to be modified. In other embodiments, the source IP address may be the actual source IP address in the incoming IP stream header. It should be noted that the source IP address may not be defined in the IP address lookup table. In some embodiments, a table using an internal nomenclature to define the instruction bin 16 location for each source may be used.

The external command interface receives a command string from an external control system at step 104. As shown, this command may be initiated from either a manual control panel (step 101), an automation computer (step 102), or a GUI control surface (step 103). At step 104, the external control system reads the command requests and creates a command data stream that contains the data to define a specific routing instruction request. The command string may be received by the external command interface at step 105. The command string may define the source and destination data in the native nomenclature of the external control system and may include the IP addresses of either the source or destination. At step 106, the external command interface interprets the request for the external command processor.

In one embodiment, one instruction bin may be defined for a given source found in the IP address lookup table 13. The external command processor may define whether the route command requests an additional route or replaces an existing route at step 107. If the command requests a replacement, the external command processor may define whether one or more existing destinations for this source should be removed or if the new destination is to be removed from one or more sources at step 108.

If the request is to add a new destination to the existing destinations for this source stream, the external command processor 12 may load an instruction command in the instruction bin 16 for the source defined in the original command at step 109. If a destination IP address exists in the bin 16, a new address is added to that list. The new destination IP address is the IP address to be loaded into the bin 16.

At step 108, if the request is to replace one or more existing destinations for the source stream, the external command processor 12 may create two instruction commands. First, a command may be created to add the new destination to the bin 16 and load this instruction command in the bin 16 for the source defined in the original command. In this configuration, the new destination IP address may be an IP address to be loaded into the instruction bin 16. A second command may also be created to delete the designated destination IP addresses defined to be replaced. This delete command may also be sent to the bin 16.

At step 110, the external command processor may read the translated command to define the source identities and the new destination identity. At step 111, the external command processor may identify the instruction bins defined for each identified source. At step 112, the external command processor may query the IP address look up table for the IP address of the new destination identity. At step 113, it is determined whether to add or remove an address from the instruction bin.

If the request is to add the new destination, at step 115, a command to add the new destination to the instruction bin 16 may be created and the instruction command may be loaded in the instruction bin 16 for the source defined in the original command. The new destination IP address may be the IP address to be loaded into the instruction bin 16. If the request is to remove the new destination for this source stream from one or more other source streams, the external command processor 12 may create a number of instruction commands. A number of additional commands may be created equal to the number of sources from which this destination is to be removed. These commands may be sent to the instruction bins defined for the sources from which this destination is to be removed. Each command may instruct the instruction bin to delete this destination IP address from its list of addresses at step 114.

If no addition or replacement designation is provided in the route request, the external command processor 12 may default to either just adding this destination to the source bin 16 or remove the new destination from all other sources than the one in the new route request. The choice of a default method may be a fixed process parameter or configurable.

A specific time for the new destination route to be executed may also be included in an embodiment. A time source 14 may be included or coupled to the system. In one embodiment, an execution controller 15 may be coupled to the time source 14. The execution controller may be configured as an execution policy manager. If the initial route request contains an execution time parameter at step 116, the execution controller may add an "Inhibit" flag on the destination IP address it sends to the bin 16 at step 117. The execution controller may then place a comparator function in an instruction stack where the time parameter value is compared with the time source value. As shown in steps 117-119, when the time source value matches the time parameter value, the execution controller 15 may remove the "Inhibit" flag for that destination in the instruction bin 16 and the new destination may become active in the insertion process discussed below.

Figure 6:
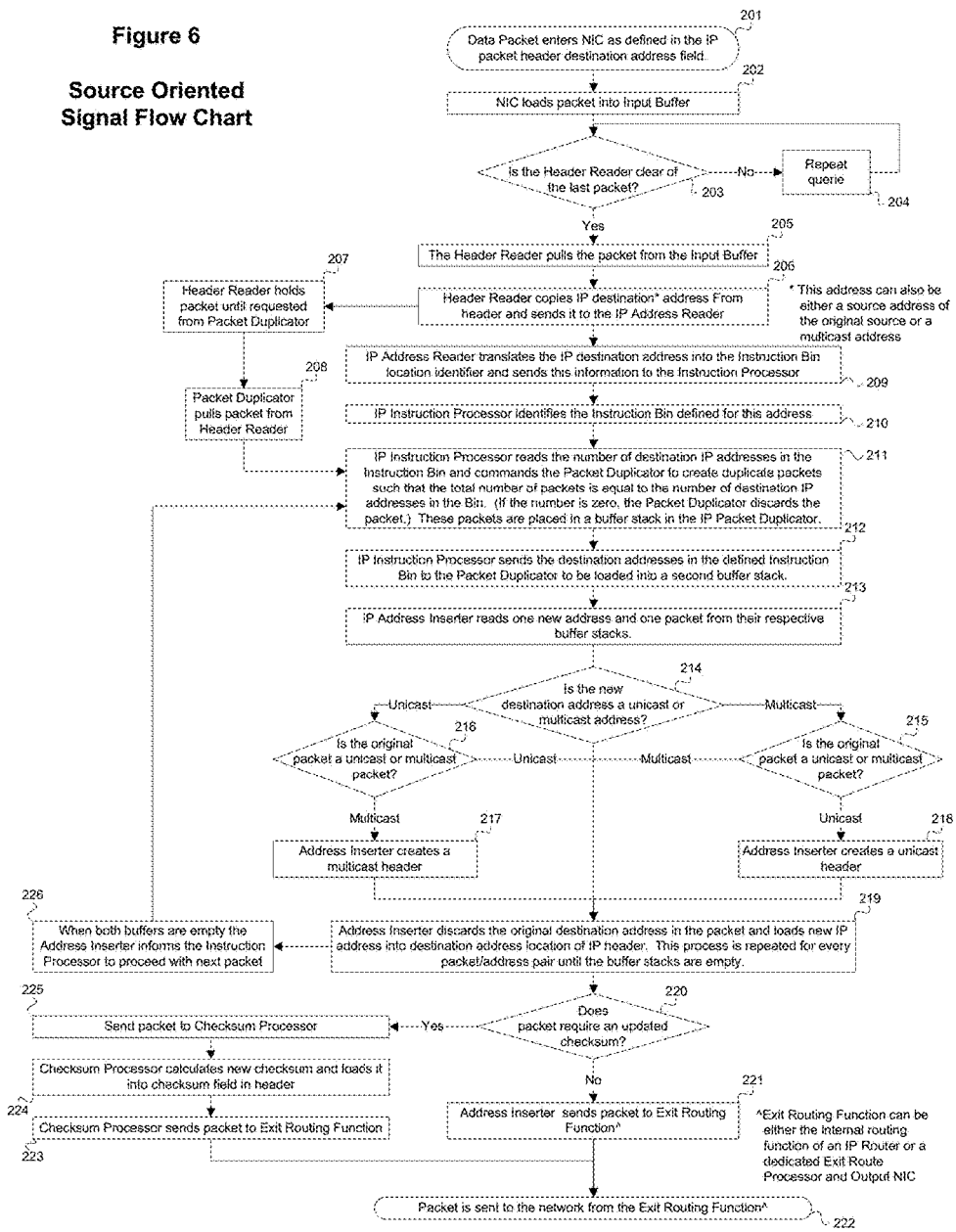
FIG. 6 illustrates a source oriented signal process in an embodiment.

FIG. 6 illustrates a process flow for a source oriented signal flow, which may be performed in a server, as a separate process, or within an IP router as part of the routing process.

An input network interface port, such as a network interface card, (NIC) 17 may receive packets from the network which contain destination IP addresses defined for this device at step 201. The destination IP address may be a unique destination address assigned to each source as a "subscription." The destination IP address may also be a single destination address for all incoming source streams, when the actual source IP address in the stream is used for the source stream identifier. For source stream identification, a corresponding entry for that source may be configured in an IP address lookup table 13 or an instruction bin 16 assignment table that identifies a unique instruction bin.

The packets received by the input NIC 17 may be stored in a buffer at step 202 and read out by a header reader 18, where the source identifying IP address of the packet is isolated. The header reader 18 may hold the packet until a "Send" command is received from a packet duplicator 21, as shown in steps 203-205 and 207 and 208. The destination IP address field of the incoming packet may be copied from the packet in the header reader 18 (step 206) and sent to the IP address reader 19. If the source address is used as the source identifier, both the source and destination address fields may be copied and sent to the IP address reader. The IP address reader may read the source identifying IP address, translate the IP address into the internal nomenclature that defines the bin for that source, and sends it to an instruction processor 20 at step 209. The instruction processor may identify the bin 16 defined for the source identifying IP address at step 210.

At step 211, the instruction processor may read the destination IP addresses in the bin and then send a command to the packet duplicator 21 to read the packet from the header reader 18 and duplicate the packet it receives to create a number of packets equal to the number of destination IP addresses in the bin 16.

In one method, the packet content may be separated from the packet address header as an isolated element for address processing. In another embodiment, the address portion of the packet may be embedded in the header of the complete packet.

At step 211, the instruction processor may send all of the destination addresses in the bin 16 to a buffer stack in the packet duplicator 21, which may duplicate the packet it has received from the header reader 18 until it has the number of packets defined by the instruction processor 20. The packet duplicator 21 may load these packets into a second buffer stack at step 212.

At step 213, the address inserter 22 may read the packets from one buffer stack and the destination addresses from the second buffer stack in the packet duplicator 21. The IP address inserter 22 may determine whether the original packet is a unicast or multicast packet.

It is determined at step 214 if destination address is unicast or multicast. As shown in steps 216 and 217, if the original packet is a unicast packet and the new address is a unicast destination address, the IP address inserter 22 removes the original destination address and places the new destination address in the packet. If the new address is a multicast address, the address inserter 22 modifies the packet header to become a multicast header and places the new multicast destination address in the packet header.

As shown in steps 215 and 218, if the original packet is a multicast packet and the new address is a multicast destination address, the IP address inserter 22 removes the original destination address and places the new destination address in the packet. If the new address is a unicast address, the address inserter 22 modifies the packet header to become a unicast header and places the new unicast destination address in the packet header.

Once the address inserter 22 has emptied both buffer stacks, it may inform the instruction processor 20 to begin the process for the next packet, as shown in steps 219 and 226. The address inserter 22 may also define if the packet is a UDP packet or other packet format that requires a port assignment or a new checksum for the new address.

If the packet is a UDP or other packet that uses a port assignment, the original UDP port is maintained, unless the IP address lookup table 13 defines a new port for the new address. If a new port is required, that port assignment may be part of the new destination IP address data loaded in the bin 16

If the packet does not require a new checksum at step 220, it is sent directly to the exit routing process, as shown in steps 221 and 222. If the packet requires a new checksum at step 220, it is sent to the checksum processor 23, which may calculate a new checksum for that packet and enter the corrected checksum into the checksum field of the packet header, as shown in steps 224 and 225. The checksum processor 23 may then send the packet to the exit routing process at step 223.

The above method may be executed in an IP router prior to the routers route processing, such that the route tables may execute the routing based on the new destination address. The MAC address fields may be unchanged and the exit routing process may be the IP router and its internal routing processes.

For a dedicated address replacement device, the MAC address of the next hop may be defined and performed in the exit routing processor 24. This can be done using either a fixed MAC insertion where the next hop is fixed for all destination addresses, with an internal ARP table, or other mechanism, that defines the MAC address and exit port for the next hop for the new destination address. The exit routing processor 24 may send the completed packet to the output NIC 25 and then over a network. The output NIC 25 may contain one or more exit ports.

Figure 7:
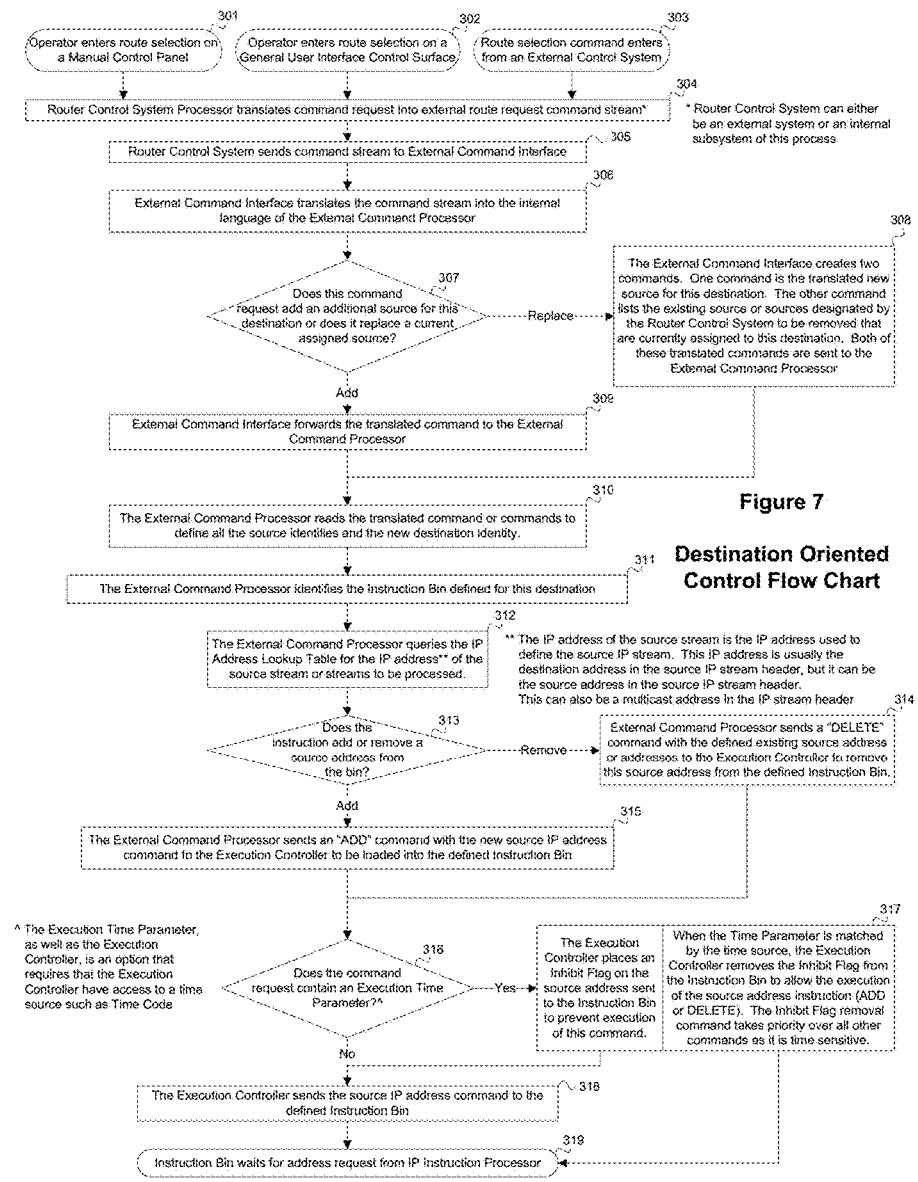
FIG. 7 illustrates a destination oriented process in an embodiment.

FIG. 7 illustrates a process flow for a destination oriented control method. Destination oriented routing organizes the routing instructions based on the outgoing destination data stream. In this method, each destination IP address may have a designated bin 16 assigned to it and all the sources that are to be sent to this destination may be listed in the bin 16 identified for that destination.

The external command processor 12 may query the IP address lookup table 13 for the IP address of the source and destination defined in the command request. The IP address lookup table 13 includes the IP addresses defined for sources and destinations in the system. The "source IP address" may be defined as the destination IP address (multicast or unicast) in the packet header from the source to be modified. The source IP address may also be the source IP address in the Incoming IP stream header.

The external command interface receives a command string from an external control system at step 304. As shown, this command may be initiated from either a manual control panel (step 301), an automation computer (step 302), or a GUI control surface (step 303). At step 304, the external control system reads the command requests and creates a command data stream that contains the data to define a specific routing instruction request. The command string may be received by the external command interface at step 305. The command string may define the source and destination data in the native nomenclature of the external control system and may include the IP addresses of either the source or destination. At step 306, the external command interface interprets the request for the external command processor.

In one embodiment, an instruction bin 16 may be defined for a destination defined in the IP address lookup table 13. The external command processor 12 may define whether the route command requests an additional route or replaces an existing route at step 307. If the command requests a replacement, the external command processor 12 defines whether one or more existing sources for this destination may be removed or if the new source is to be removed from one or more destinations.

If the request is to add a new source stream to the existing source streams for this destination at step 307, the external command processor 12 may load an instruction command with the new source address in the instruction bin 16 for the destination defined in the original command. If there are already source IP addresses in the instruction bin 16, the new address may be added to that list. The source IP address (or source stream designation nomenclature) may be the IP address loaded into the instruction bin 16.

If the request is to replace one or more existing sources streams for this destination at step 307, the external command processor 12 creates two instruction commands at step 308. It creates one command to add the new source to the instruction bin 16 and may load this instruction command in the instruction bin 16 for the destination defined in the original command. The source IP address (or source stream designation nomenclature) may be the IP address to be loaded into the instruction bin 16. A second command may be created to delete the designated source IP addresses defined to be replaced and may send this Delete command to the same instruction bin 16.

The external command interface may forward the translated command to the external command processor in step 309, if an addition is determined at step 307. At step 310, the external command processor may read the translated instruction commands that are either passed from step 309 (add only) or created in step 308 (add and remove) to define the source identities and the new destination identity. At step 311, the external command processor may identify the instruction bins defined for these instructions. At step 312, the external command processor may query the IP address look up table for the IP address of the source stream to be processed. At step 313, it is determined whether to add or remove an address from the instruction bin.

If the request is to remove the new source stream for this destination from one or more other destinations, the external command processor 12 may create a number of instruction commands at step 314. Of these commands, the processor 12 may send one command to add the new source to the instruction bin 16 and may load this instruction command in the bin 16 for the destination defined in the original command. The source IP address (or source stream designation nomenclature) may be the IP address to be loaded into the bin 16. A number of additional commands may also be sent equal to the number of destinations from which this source stream is to be removed to delete the designated source IP addresses defined for the new route from the bins 16 defined for the destinations from which this source is to be removed. The external command processor 12 may send the Delete commands to the specific instruction bin 16 corresponding to the destination from which this source stream is to be removed.

If no addition or replacement designation is provided in the route request, the external command processor 12 may default at step 315 to either only adding the new source to the instruction bin 16 or adding the new destination to the instruction bin 16 and also removing the existing sources from the instruction bin 16 for the defined destination. The choice of default method may be either a fixed process parameter or configurable.

A specific time may be defined for the new source stream route to be executed. In one embodiment, a time source 14 and execution controller 15 may be connected or coupled to the system, as described above.

If the initial route request contains an execution time parameter at step 316, the execution controller 15 may add an "Inhibit" flag on the source IP address sent to the instruction bin 16 at step 317. It then places a comparator function in an instruction stack where the time parameter value is compared with the time source 14 value. When the time source 14 value matches the time parameter value, the execution controller 15 may remove the "Inhibit" flag for that source in the instruction bin 16 and the new source may become active in the insertion process discussed herein and shown in steps 318 and 319.

Figure 8:
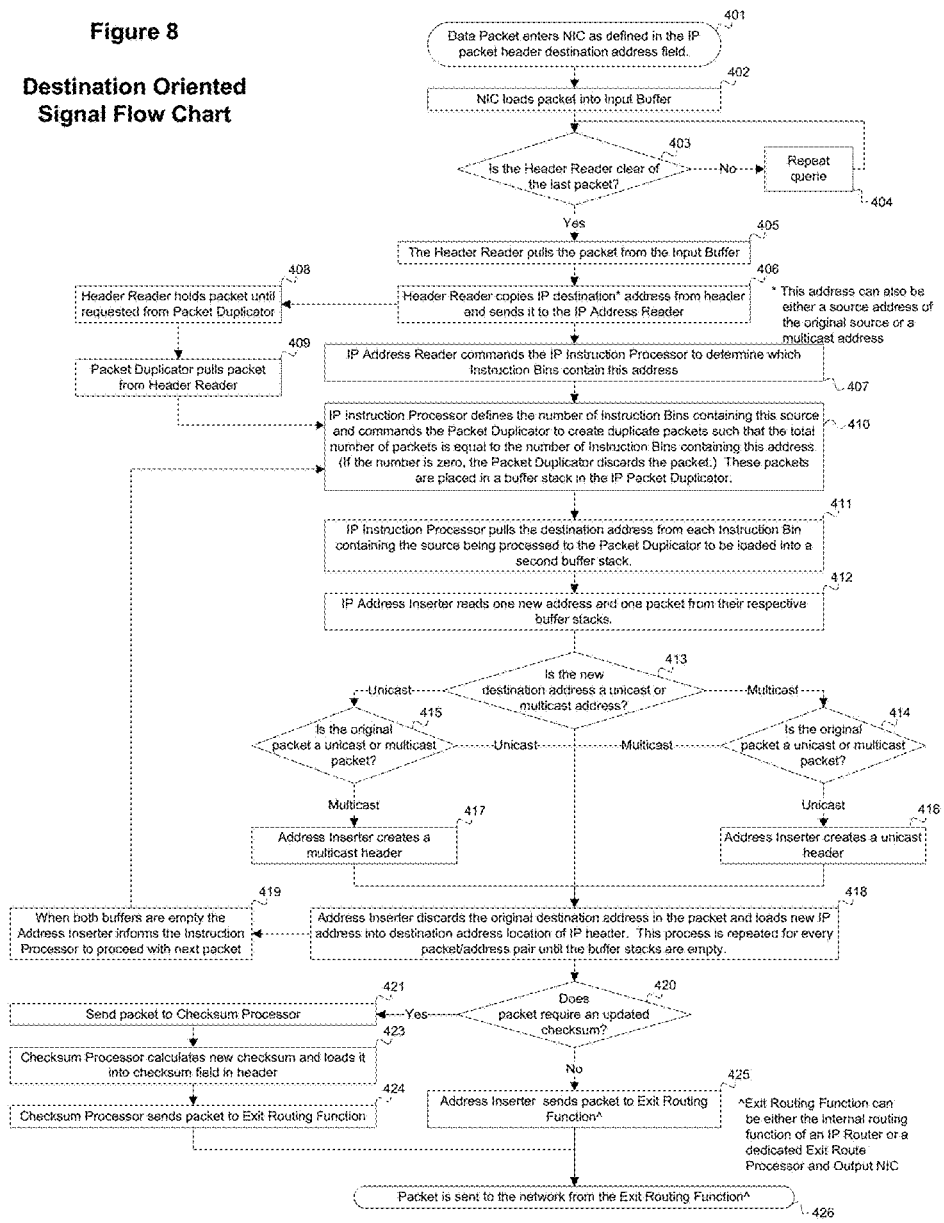
FIG. 8 illustrates a destination oriented signal process in an embodiment.
Figure 9:
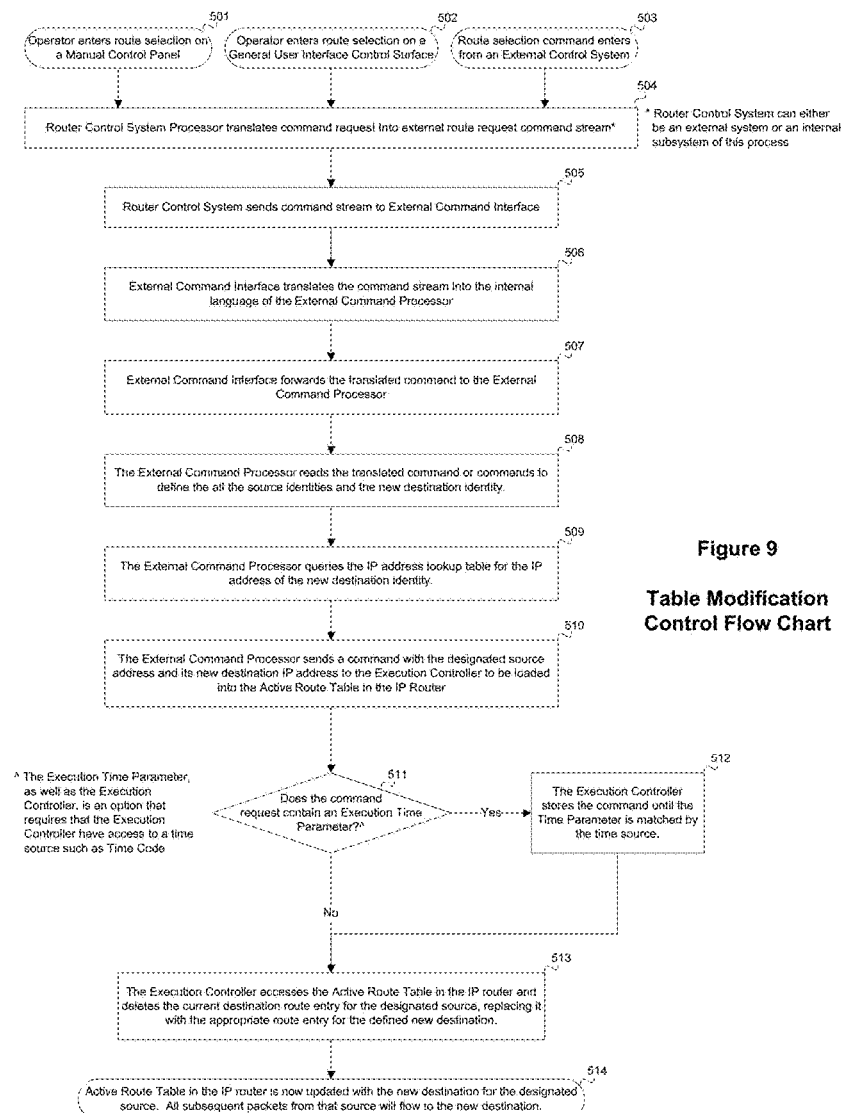
FIG. 9 illustrates a table modification control process in an embodiment.

FIG. 8 illustrates a process flow for the destination oriented signal flow. The process may be performed in either a server, as a separate process, or within an IP router as part of the routing process The input NIC 17 receives packets from the network containing destination IP addresses at step 401. This may be a unique destination address assigned to each source as a "subscription." This may also be a single destination address for all source streams if the actual source IP address in the stream is used for the source stream identifier. A corresponding entry for that source in the IP address lookup table 13 may be included that identifies each source stream as a unique signal. The IP address lookup table 13 may also contain all the destination IP addresses of the destination locations on the network subscribed to this process. Each of these destination IP addresses corresponds to a unique instruction bin 16.

The packets received by the input NIC 17 may be stored in a buffer at step 402 and read out by the header reader 18 where the source identifying IP address of the packet is isolated. As shown in steps 403-405 and 408 and 409, the header reader 18 may hold the packet until a "Send" command is received from the packet duplicator 21. The destination IP address (or the source address, if that is defined as the source identifying IP address) in the incoming packet may be copied and sent to the IP address reader 19 at step 406.

The IP address reader 19 may read the source identifying IP address and send it to the instruction processor 20, which may query the instruction bins 16 to determine if this source is requested for any destination in step 407. If it finds no entries for this source stream in any instruction bin 16, it sends a "0" command to the packet duplicator 16 where the packet is deleted. If the instruction processor 20 finds one or more instruction bins 16 containing the source, it loads the corresponding destination IP address for each instruction bin 16 into a buffer stack in the packet duplicator 21 and commands the packet duplicator 21 to create a number of copies of the original packet equal to the number of instructions bins 16 containing an entry for this source stream.

The packet duplicator 21 may duplicate the packet it has received from the header reader 18 until it has the number of packets defined by the instruction processor 20 at step 410. The packet duplicator 21 may load these packets into a second buffer stack at step 411.

Once the packet duplicator 21 loads the new packets into the instruction stack, it may send a "Send" command to the header reader 18 to forward the next packet.

The address inserter 22 reads the packets from one buffer stack and the destination addresses from the second buffer stack in the packet duplicator 21 at step 412. The IP address inserter 22 determines whether the original packet is a unicast or multicast packet at step 413.

As shown in steps 415 and 417, if the original packet is a unicast packet and the new address is a unicast destination address, the IP address inserter 22 removes the original destination address and places the new destination address in the packet. If the new address is a multicast address, the address inserter 22 modifies the packet header to become a multicast header and places the new multicast destination address in the packet header.

As shown in steps 414 and 416, if the original packet is a multicast packet and the new address is a multicast destination address, the IP address inserter 22 removes the original destination address and places the new destination address in the packet. If the new address is a unicast address, the address inserter 22 modifies the packet header to become a unicast header and places the new unicast destination address in the packet header.

Once the address inserter 22 has emptied both buffer stacks, it may inform the instruction processor 20 to begin the process for the next packet, as shown in steps 418 and 419. The address inserter 22 may also define if the packet is a UDP packet or other packet format that requires a port assignment or a new checksum for the new address.

If the packet is a UDP or other packet that uses a port assignment, the original UDP port is maintained, unless the IP address lookup table 13 defines a new port for the new address. If a new port is required, that port assignment may be part of the new destination IP address data loaded in the bin 16

If the packet does not require a new checksum at step 420, it is sent directly to the exit routing process, as shown in steps 425 and 426. If the packet requires a new checksum at step 420, it is sent to the checksum processor 23, which may calculate a new checksum for that packet and enter the corrected checksum into the checksum field of the packet header, as shown in steps 424 and 423. The checksum processor 23 may then send the packet to the exit routing process at step 424.

The above method may be executed in an IP router prior to the routers route processing, such that the route tables may execute the routing based on the new destination address. The MAC address fields may be unchanged and the exit routing process may be the IP router and its internal routing processes.

If this process is executed as a dedicated address replacement device the MAC address of the next hop may be defined and performed in the exit routing processor 24. This can be done using either a fixed MAC insertion where the next hop is fixed for all destination addresses, with an internal ARP table, or any other mechanism that defines the MAC address and exit port for the next hop for the new destination address. The exit routing processor 24 may send the completed packet to the output NIC 25 and then over a network. The output NIC 25 may contain one or more exit ports.

The source oriented and destination oriented control methods describe the route assignment data to be held in a number of instruction bins 16. In other embodiments, a table may be configured to perform route assignments including the same data as the instruction bins 16. In one embodiment, the table may be able to accommodate a dynamic assignment of multiple routes for each flow.

In one embodiment, existing routing tables in traditional IP routers or layer 2 switches may be altered to dynamically route packet streams within a network. That method is covered under this patent and is described below. In another embodiment, the above methods may be performed using existing translation tables inside an IP router or firewall.

Forwarding tables may define the next hop versus the final destination of the packet. Accordingly, address translation tables, such as NAT, PAT, etc., may be required. In one embodiment, a router may be used where all sources and destinations are directly connected or coupled to its ports. In such a configuration, standard ARP, MRoute, and other forwarding tables may be used, and the methods may be executed at either Layer 2 switching or Layer 3 routing.

An external control interface may be used to modify the route instruction entries in the tables. External route instruction commands may include input source of packets to be routed to a new destination, new destination to where packets are to be sent, or time for the instruction to take effect. The translated command is sent to the external command processor at step 508.

At step 509, the external command processor 42 queries the IP address lookup table 43 for the IP address of the source and destination defined in the command request. The IP address lookup table may include the IP addresses for sources and destinations defined in the system. In one embodiment, the "source IP Address" may be defined as the destination IP Address in the packets from the source to be modified.

At step 510, the external command processor may send an instruction command to the instruction processor 44 for the source defined in the original command, which may send a command to either a NAT or forwarding table in the IP router to change the translation address or forwarding address for the defined source IP address in the table.

For a NAT Exlate table, the policy manager for the NAT may be dynamically configured and controlled from external commands in real time The address change may be accommodated in the existing IP router tables of the IP router. A specific time for the new source stream route to be executed may also be defined. A time source 47 may be coupled or connected to the system along with an execution controller 48 acting as a policy manager.

If the initial route request does not contain a time parameter at step 511, the process proceeds to step 512. If the initial route request contains an execution time parameter at step 511, the execution controller 48 may hold the destination IP address from the external command processor before reaching the instruction processor 45. It then places a comparator function in an instruction stack where the time parameter value is compared with the time source value. As shown in steps 512-514, when the time source value matches the time parameter value, the execution controller forwards the new destination address to the active route table and the new destination becomes the active route defined in the internal IP router table.

Figure 10:
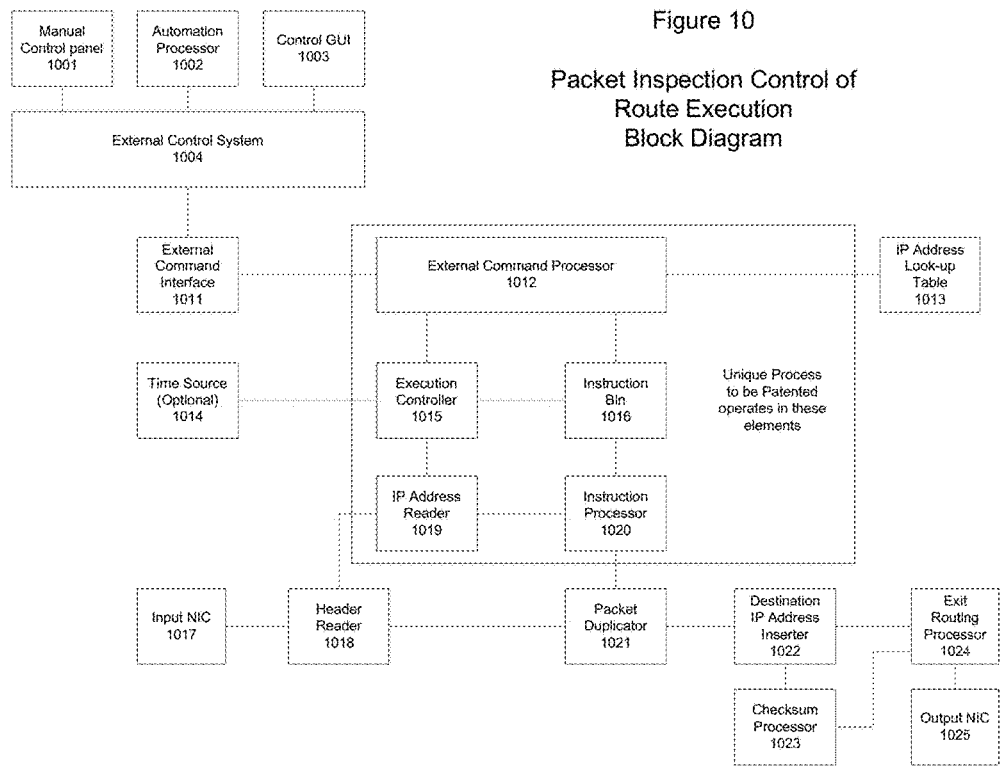
FIG. 10 illustrates a header parameter execution control system using packet header modification in an embodiment.

FIG. 10 illustrates an example system for the centralized control of IP traffic using a destination address modification method. When an external command interface 1011 receives a command string from an external control system 1004, which may be initiated from a manual control panel 1001, an automation computer 1002, or a Graphical User Interface (GUI) 1003, the command may contain permission requirements. These execution permission parameters may be placed in the instruction bin 1016 with the route request change instruction. If this is the case, an inhibit flag may be set in the instruction to prevent execution of the instruction until the execution parameter is met.

When the address reader 1019 identifies a packet matching the data stream identity specified in the instruction bin 1016, it may locate and extract the data from the execution parameter field in the header and send this data to the execution controller 1015. The execution controller 1015 may read the execution parameter data from the instruction bin 1016 and compare the data from the incoming packet header with the data from the instruction bin 1016.

There may be two types of control parameters. One type of execution control parameter may be linked to a single event, such as a specified point in time. All incoming packets that do not have a time parameter equal to the time parameter defined in the instruction bin 1016 for that source stream will not be forwarded to the destination defined in the instruction bin 16 containing this particular time parameter. Once an incoming packet meets the time parameter defined in the instruction bin 1016, all successive incoming packets from that source will be subject to the new route request, regardless of their time parameter, until another route request is received for that incoming packet stream.

The second type of execution control parameter identifies a continuous condition, such as type of content. For a parameter identifying a continuous condition, every packet may be examined to see if it meets the requirement. In a continuous flow of packets from a source, any one of them may contain the type of content described in the execution control parameter in the instruction bin. Each packet may be evaluated for content type match as long as the instruction remains in the instruction bin 1016. For the incoming defined IP data stream, any packet containing the content type ID will be forwarded to the destination in the instruction bin 1016 containing that content type requirement. Any incoming packet that does not contain that content type ID will not be forwarded to the destination in the instruction bin 1016 with the content type requirement.

In a single event type of execution control parameter, when the data in the instruction parameter field matches the instruction parameter data in the instruction bin 1016, the execution controller 1015 may send a command to the instruction bin 1016 to remove the inhibit flag for this instruction and allow the packet routing request to occur as a continuous process from that time forward until the instruction is removed from the instruction bin by the external command processor 1012.

In a continuous condition type of execution control parameter, the execution controller 1015 may command the instruction bin 1016 to forward the destination in the instruction to the packet duplicator 1021, but retain the inhibit flag, such that every packet may be evaluated for this condition in the future until the instruction is removed from the instruction bin by the external command processor 1012.

In the event that a header data field, similar to the one described in FIG. 14 below, is used to define the content parameters, either part or all of the parameter data may be used to authorize the execution of the event. The example in FIG. 14 defines a portion of the field for content type (bits 2-7) and another portion of the field for timing (bits 8-31). An instruction may limit its requirement to the timing portion of the field, in which case all packets in this data stream, regardless of content type, may be routed to the destination defined in the instruction. An instruction may also require that both elements of the field be met. In this case, the execution of the instruction may be applied to the packets that contain the corresponding content type parameter, once the timing parameter is met.

Figure 11:
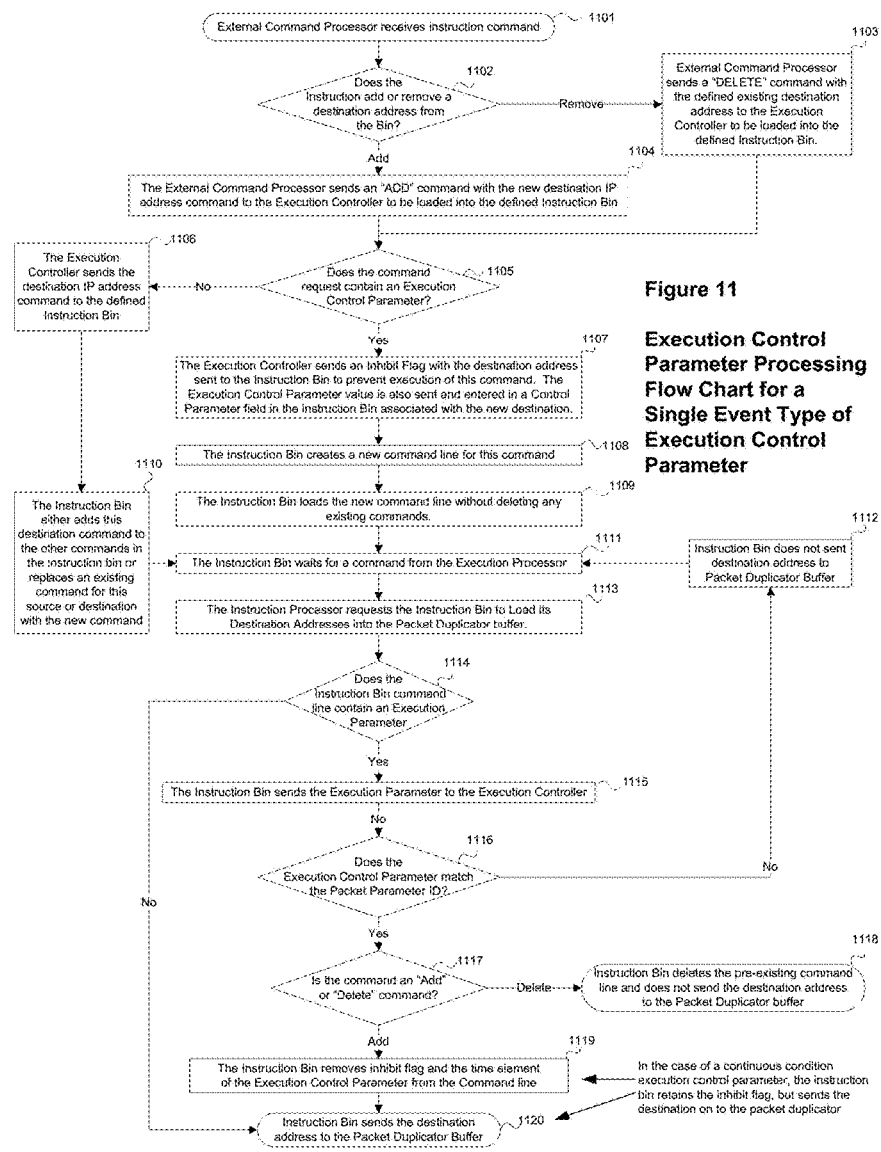
FIG. 11 illustrates a source oriented header parameter execution process in an embodiment.

FIG. 11 describes one example process in an embodiment. The external command processor 1011 may receive a command string from an external control system at step 1101. At step 1102, the external command processor 1011 may read the command requests and create a command data stream that contains the data to define a specific routing instruction request. This command may request to either add a new destination for a defined source stream (step 1103) or remove an existing destination for a defined source stream (step 1104). The command string may be received by the execution controller 1015 at step 1105. At step 1105, the execution controller 1015 may interpret the command string from the external command processor 1011.

In one embodiment, one instruction bin 1016 may be defined for a given source data stream found in the IP address lookup table 1013. In step 1105, the execution controller 1015 may examine the command string to determine if it contains an execution control parameter. If it does not contain an execution control parameter the destination command (either add or delete) may be send to the instruction bin 1016, in step 1106, for immediate execution availability.

If the command string does contain an execution control parameter, an inhibit flag may be added to the destination command and sent to the instruction bin 1016 in step 1107. The inhibit flag may prevent the execution of the command until the execution control parameter in the command string is met.

The command with the inhibit flag may be loaded into the instruction bin 1016 in steps 1108 and 1109. The instruction bin 1016 may wait for a request from the instruction processor 1020 in step 1111 to send its destination addresses to a memory stack in the instruction processor. When the instruction processor instructs the instruction bin to load all the destinations identified for the incoming packet in step 1113, the instruction bin 1016 may send all the destinations in its memory that have no inhibit flag to the instruction processor 1020 in step 1114. If any of the destination address commands in the instruction bin 1016 have an inhibit flag the execution parameter in the command may be sent to the execution controller 1015 in step 1115.

The execution controller 1115 may compare the execution parameter data from the incoming packet header with the execution control parameters from the command or commands in the instruction bin 1016 in step 1116. In this example the execution control parameter is a single event time parameter. If any of the execution control parameters from the instruction bin 1016 match the execution parameter data from the packet header, the execution controller 1015 may send a command to the instruction bin 1016 in step 1119 to remove the inhibit flag for the matching destination commands and allow those destinations to be sent to the packet duplicator 1021 for immediate execution, as instructed by the instruction processor in step 1120.

If the execution control parameter was a continuous condition parameter the command from the execution controller 1015 may direct the instruction bin 1016 in step 1119 to send the destination to the packet duplicator but keep the inhibit flag.

If any of the affected commands replaces or deletes an existing destination command in the instruction bin 1016, the existing command remains active until the inhibit flag is removed from the new command. At that time the existing destination command to be replaced in the instruction bin may be removed from the instruction bin 1016 in step 1118.

Figure 12:
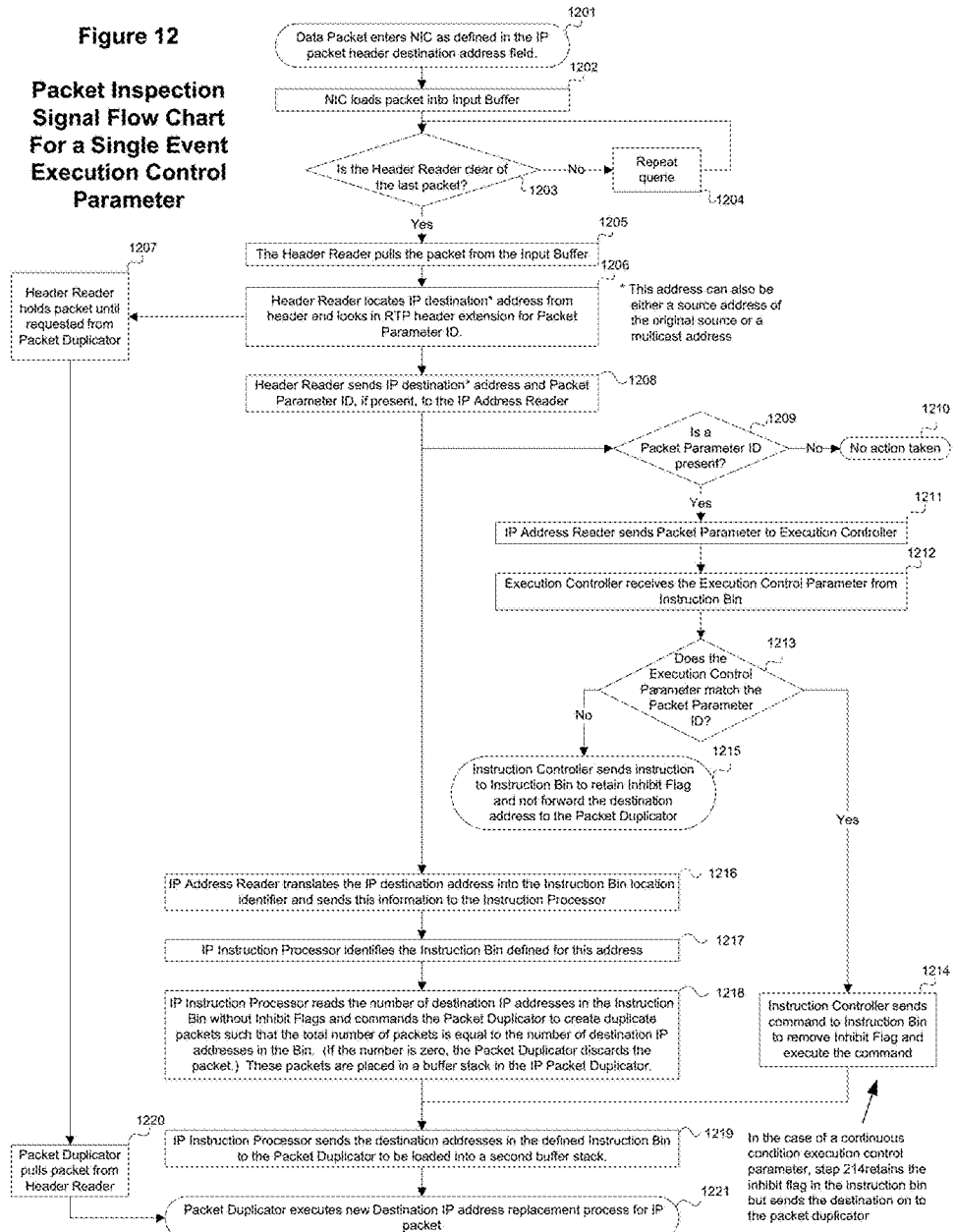
FIG. 12 illustrates a source oriented header parameter execution signal process in an embodiment.

FIG. 12 describes one example signal flow in an embodiment. The input network interface 1017 may receive a packet from the network at step 1201. At step 1202, the network interface 1017 may load this packet into a buffer and hold it (step 1203 and step 1204) until the header reader 18 is ready to process the packet in step 1205.

Figure 13:
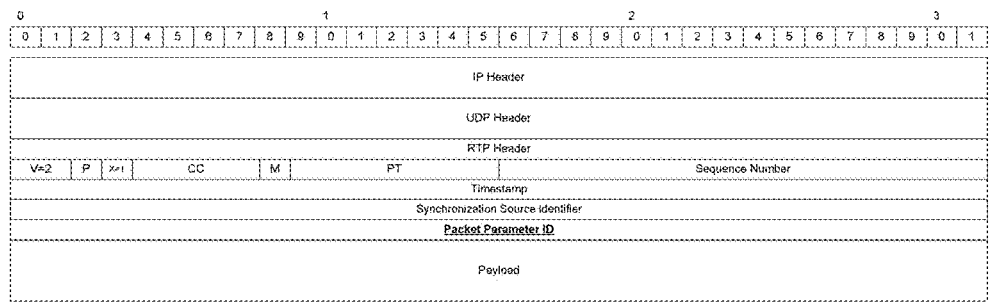
FIG. 13 illustrates an example of a possible placement of header field content parameters in a packet header stack in an embodiment.

The header reader 1018 may look in the IP header for the destination address for this packet in step 1206. Using the example header location of the execution control parameter data shown in FIG. 13, the header reader 1018 may also look in the RTP header for the execution control parameter data in step 1206. If no execution parameter is found only the incoming packet destination address may be sent to the address reader 1019 in step 1208. In this example, the destination address of the incoming packet defines the source location of the packet. If an execution control parameter is found in the RTP header the header reader may also send the execution control parameter to the address reader along with the incoming packet destination address in step 1208.

The address reader 1019 may identify the instruction bin 1016 defined for the incoming packet in steps 1216 and 1217 and forward the instructions in instruction bin 1016 defined for the present packet to the instruction processor 1020 in step 1218. The instruction processor may request the destination addresses in the instruction bin be sent to the destination address stack in the packet duplicator 1021 in step 1219. In the event that an execution control parameter is present in step 1209, the address reader 1019 may send the execution control parameter data to the execution controller 1015 in steps 1211 and 1212. The execution controller 15 may compare the execution control parameter with any execution control parameters provided from the instruction bin 1016 for this incoming packet in step 1213. This example embodiment describes a single event execution control parameter. If any of the execution control parameter entries from the instruction bin 1016 match the execution control parameter data from the incoming packet the execution controller may send an instruction back to the instruction bin 1016 to remove the inhibit flag from that destination command in step 1214.

For a continuous condition execution control parameter, in the situation where the parameter in the incoming packet matches the parameter in the instruction bin, the execution controller 1015 may command the instruction bin 1016 to send the destination address associated with this execution control parameter to the packet duplicator 1021, but retain the inhibit flag in step 1214 to insure that the execution control parameter is evaluated for each future incoming packet until the external command processor 1012 removes this destination command from the instruction bin 1016.

If any execution control parameters from the instruction bin 1016 do not match the execution control parameter data from the present packet in the execution controller, no action is taken for that specific instruction in the instruction bin 1016, in step 1215, and the inhibit flag may remain in the instruction bin for that destination command.

If no parameters are received from the instruction bin 1016 the execution controller 1015 may discard the control parameter data sent from the address reader 1019.

At step 1218, the instruction processor 1020 may read the destination IP addresses in the instruction bin 1016. The instruction processor 1020 may send a command to the packet duplicator 1021, in step 1219, to read the packet from the header reader 1018, in step 1220, and duplicate the packet it receives to create a number of packets equal to the number of destination IP addresses in the instruction bin 1016 in step 1221. The packet duplicator 1021 may place the destinations received from the instruction bin 1016 into the destination field of the packets it has duplicated, such that the packet route process can be executed in the routing processes of the device.

In the example described above and shown in FIG. 13, the execution control parameter data is located in the header extension for the RTP header. This execution control parameter data may be located in any location of any of the header fields or even in the payload. The methods and systems described define that the packet router or switch may have a foreknowledge of where this data is located and detect and evaluate this data to define permission parameters to execute a specific route request for an incoming packet. In one embodiment, this data may be located in a predictable place in the header to make the availability of this data to the router or switch more convenient and closer to emulating existing route or switch processes.

Figure 14:
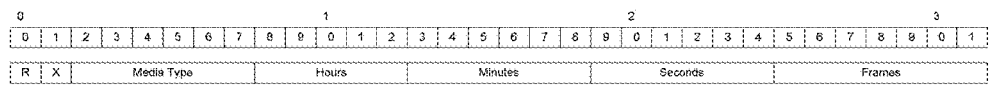
FIG. 14 illustrates an example of a possible content parameter placement in a header field in an embodiment.

In the example header field shown in FIG. 14, the execution control parameter data consists of content type description and a content time stamp.

In other embodiments, the processing modules may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The present invention or any part(s) or function(s) thereof, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

It should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A method for routing data in an Internet Protocol (IP)-based network, comprising: providing a data packet; determining an execution control parameter in the data packet to determine if the execution control parameter is one of a single event and a continuous condition; wherein the single event is one of a content segment boundary and media control descriptor and a continuous condition comprises a content type; separating multiple data content types from a single packetized stream into multiple separate packetized streams, when the multiple data types are provided in separate data packets, each type with a unique continuous condition parameter; and forwarding the data packet to one or more destinations based on permission criteria provided from an external source, wherein forwarding the data packet includes forwarding the data packet to one or more of a unicast and multicast destination address.

2. The method of claim 1 further comprising determining if the execution control parameter is located in a packet payload.

3. The method of claim 1 further comprising determining if the execution control parameter is located in a packet header.

4. The method of claim 1, wherein the single event further comprises a time based parameter.

5. The method of claim 4, wherein the single event is a specified point in time.

6. The method of claim 4, where the single event is a media time code.

7. The method of claim 1 wherein the determining if the execution control parameter identifies the continuous condition includes examining the data packet.

8. The method of claim 7, wherein if the examination determines a specified content type, then forwarding the packet to a destination in an instruction parameter.

9. The method of claim 1 further comprising comparing the execution control parameter to a field in one of a route table and an instruction-parameter.

10. The method of claim 9 further comprising removing an inhibit flag associated with a routing instruction request to enable a continuous forwarding instruction.

11. The method of claim 9 further comprising setting an inhibit flag to prevent forwarding of the data packet prior to evaluation by a controller.

12. The method of claim 1 further comprising comparing instructions in an IP routing device to a route control parameter.

13. The method of claim 1 further comprising forwarding the data packet based on a table of instructions.

14. The method of claim 1 further comprising comparing one or more conditions in a routing device to a route control parameter.

15. The method of claim 1 further comprising dynamically changing one or more conditional parameters of either the single event or the continuous condition in a routing device from an external device.

16. The method of claim 1 further comprising providing at least one of a packet payload and a header of a specific content type when multiple content types are in a stream of data and each content type is divided into unique packets in the stream of data.

17. The method of claim 1 further comprising providing unique routing instructions to each packet containing a unique content type as defined by the continuous condition.

18. The method of claim 1 wherein the single event further comprises a content or network synchronizing time stamp, including a Presentation Time Protocol or Real Time Protocol time stamp.

19. The method of claim 1 wherein the single event further comprises a content or network synchronizing time stamp, including a Presentation Time Protocol or Real Time Protocol time stamp.

20. A computer program product, stored on a non-transitory computer readable medium, instructions that, when executed on one or more computers, cause the one or more computers to perform operations of: providing a data packet; determining an execution control parameter in the data packet to determine if the execution control parameter is one of a single event and a continuous condition; wherein the single event is one of a content segment boundary and media control descriptor and a continuous condition comprises a content type; separating multiple data content types from a single packetized stream into multiple separate packetized streams, when the multiple data types are provided in separate data packets, each type with a unique continuous condition parameter; and forwarding the data packet to one or more destinations based on permission criteria provided from an external source, wherein forwarding the data packet includes forwarding the data packet to one or more of a unicast and multicast destination address.

21. The computer program product of claim 20 further comprising determining if the execution control parameter is located in a packet payload.

22. The computer program product of claim 20 further comprising determining if the execution control parameter is located in a packet header.

23. The computer program product of claim 20, wherein the single event further comprises a time based parameter.

24. The computer program product of claim 23, wherein the single event is a specified point in time.

25. The computer program product of claim 23, where the single event is a media time code.

26. The computer program product of claim 20 wherein the determining if the execution control parameter identifies the continuous condition includes examining the data packet.

27. The computer program product of claim 26, wherein if the examination determines a specified content type, then forwarding the packet to a destination in an instruction parameter.

28. The computer program product of claim 27 wherein the content comprises one or more elements of a data stream.

29. The computer program product of claim 20 further comprising comparing the execution control parameter to a field in a route table.

30. The computer program product of claim 29 further comprising removing an inhibit flag in the instruction bin to enable a continuous forwarding instruction.

31. The computer program product of claim 29 further comprising setting an inhibit flag to prevent forwarding of the data packet prior to evaluation by a controller.

32. The computer program product of claim 20 further comprising forwarding the data packet based on a table of instructions.

33. The computer program product of claim 20 further comprising comparing one or more conditions in a routing device to a route control parameter.

34. The computer program product of claim 20 further comprising dynamically changing one or more conditional parameters of either the single event or the continuous condition instructions in a routing device from an external device.

35. The computer program product of claim 20 further comprising providing at least one of a packet payload and a header a specific content type when multiple content types are in a stream of data and each content type is divided into unique packets in the stream of data.

36. The computer program product of claim 20 further comprising providing unique routing instructions to each packet containing a unique content type as defined by the continuous condition.

37. The computer program product of claim 20 wherein the single event further comprises a content or network synchronizing time stamp, including a Presentation Time Protocol or Real Time Protocol time stamp.

38. The computer program product of claim 20 wherein the single event further comprises a content or network synchronizing time stamp, including a Presentation Time Protocol or Real Time Protocol time stamp.

* * * * *